(12) United States Patent
Soeda et al.

(10) Patent No.: US 8,021,728 B2
(45) Date of Patent: Sep. 20, 2011

(54) POLYAMIDE RESIN COMPOSITION HAVING SUPERIOR EXTENSIBILITY AND FLEXING FATIGUE AND PNEUMATIC TIRE AND HOSE USING THE SAME

(75) Inventors: Yoshihiro Soeda, Hiratsuka (JP); Yuichi Hara, Hiratsuka (JP); Naoyuki Morooka, Hiratsuka (JP); Andy Haishung Tsou, Houston, TX (US)

(73) Assignees: The Yokohama Rubber Co., Ltd., Tokyo (JP); ExxonMobil Chemical Patents Inc., Houston, TX (US)

( * ) Notice: Subject to any disclaimer, the term of this patent is extended or adjusted under 35 U.S.C. 154(b) by 26 days.

(21) Appl. No.: 12/523,477

(22) PCT Filed: Jan. 18, 2007

(86) PCT No.: PCT/US2007/060699
§ 371 (c)(1),
(2), (4) Date: Sep. 15, 2009

(87) PCT Pub. No.: WO2008/088555
PCT Pub. Date: Jul. 24, 2008

(65) Prior Publication Data
US 2010/0099821 A1   Apr. 22, 2010

(51) Int. Cl.
*C08L 77/00* (2006.01)
*C08L 77/02* (2006.01)
*C08L 77/06* (2006.01)
*B60C 1/00* (2006.01)

(52) U.S. Cl. ... 428/35.7; 152/510; 428/36.9; 428/36.91; 428/36.92; 525/178; 525/179; 525/180; 525/181; 525/182; 525/183

(58) Field of Classification Search ............... 525/66, 525/178, 179, 180, 181, 182, 183; 428/35.7, 428/36.9, 36.01, 36.92; 152/510
See application file for complete search history.

(56) References Cited

U.S. PATENT DOCUMENTS

| | | |
|---|---|---|
| 4,174,358 A | 11/1979 | Epstein |
| 4,594,386 A | 6/1986 | Olivier |
| 6,617,383 B2 | 9/2003 | Ikawa et al. |
| 2004/0031550 A1 | 2/2004 | Kanenari et al. |

FOREIGN PATENT DOCUMENTS

| | | |
|---|---|---|
| CN | 1473116 A | 2/2004 |
| EP | 0733668 A2 | 9/1996 |
| EP | 1424219 A1 | 6/2004 |
| EP | 1728824 A2 | 12/2006 |

OTHER PUBLICATIONS

Decision on Grant dated Feb. 4, 2011 issued from Patent Office of the Russian Federation in corresponding Russian Appl. No. 2009131316.
Encyclopedia of Polymers, vol. 2, Moscow, Svetskaya Encyclopedia, 1974, pp. 325-332 and pp. 729-732, with English translations.
Office Action mailed Mar. 23, 2011 issued in corresponding Chinese Patent Application No. 200780050088.6.

*Primary Examiner* — Ana Woodward
(74) *Attorney, Agent, or Firm* — Connolly Bove Lodge & Hutz LLP

(57) ABSTRACT

A polyamide resin composition, having an excellent extensibility and flexing fatigue, composed of a polyamide resin (A), as a matrix, and a modifying polymer (C), dispersed therein, having a functional group (B) reactive with the polyamide resin (A), wherein a tensile stress at break of the modifying polymer (C) is 30 to 70% of the tensile stress at break of the polyamide resin (A), and a tensile elongation at break of the modifying polymer (C) is 100 to 500% of the tensile elongation at break of the polyamide resin (A) as well as a pneumatic tire and hose using the same.

8 Claims, No Drawings

US 8,021,728 B2

POLYAMIDE RESIN COMPOSITION HAVING SUPERIOR EXTENSIBILITY AND FLEXING FATIGUE AND PNEUMATIC TIRE AND HOSE USING THE SAME

CROSS REFERENCE TO RELATED APPLICATIONS

This application is a National Phase of International Application No. PCT/US2007/060699 filed on Jan. 18, 2007, the entire contents of all are hereby incorporated by reference.

TECHNICAL FIELD

The present invention relates to a polyamide resin composition and a pneumatic tire and hose using the same. More specifically it relates to a polyamide resin composition having a superior extensibility and flexing fatigue and a pneumatic tire and hose using the same.

BACKGROUND OF THE INVENTION

A polyamide resin has superior workability (or processability), chemical resistance and heat resistance and a low gas permeability, and therefore, has been broadly used for injection molded products, extruded products, blown products, films, etc., utilizing these properties. However, since a polyamide resin is not necessarily sufficient in terms of impact resistance, fatigue resistance, etc., the improvement of these properties under a usage environment receiving dynamic strain has been required. As a means for improving the impact resistance of a polyamide resin, it is known in the art to blend a modifier composed of an elastomer ingredient (see, for example, U.S. Pat. No. 4,174,358 and U.S. Pat. No. 4,594,386. However, for the fatigue resistance, depending upon the usage environment, the mechanism of failure is complicated, a sufficient effect of improvement could not been obtained with just blending an elastomer. Various modifiers for polyamide resins, in particular nylons have been proposed by manufacturers. However, under extension and flexing fatigue environments, a large load acts on interface of the polyamide-modifier and inside the modifier whereby interfacial failure or modifier failure occur and a sufficient effect of improvement by the modifier cannot be obtained.

SUMMARY OF INVENTION

Accordingly, an object of the present invention is to provide a modified polyamide resin composition having excellent extensibility and flexing fatigue and a pneumatic tire and hose using the same.

In accordance with the present invention, there are provided a polyamide composition comprising a polyamide resin (A), as a matrix, and a modifying polymer (C), dispersed therein, having a functional group (B) reactive with the polyamide resin (A), wherein a tensile stress at break of the modifying polymer (C) is 30 to 70% of the tensile stress at break of the polyamide resin (A), and a tensile elongation at break of the modifying polymer (C) is 100 to 500% of the tensile elongation at break of the polyamide resin (A) and a pneumatic tire and hose using the same.

In the present invention, by incorporating, into the polyamide resin composition, the modifying polymer (C) having a functional group (B) capable of sufficiently reacting with the polyamide resin (A) to strengthen the interface that is, by blending a modifier having sufficiently strong tensile properties with respect to the polyamide resin (A), the extension and flexing fatigue properties are improved.

BEST MODE FOR CARRYING OUT THE INVENTION

The present inventors engaged in research to solve the above-mentioned problems and, as a result, succeeded in solving the problem by a polyamide resin composition comprising a polyamide resin (A) and a modifying polymer (C), dispersed therein, having a functional group (B) a capable of reacting with the polyamide resin (A), having a tensile stress at break of 30% to 70%, preferably 40 to 70%, of the tensile stress at break, of the polyamide resin (A), and having a tensile elongation at break of 100% to 500%, preferably 110 to 500%, of the tensile elongation at break of the polyamide resin (A), blended thereinto.

According to a preferred embodiment of the present invention, by making the volume fraction of the modifying polymer (C) 40% or more, preferably 40 to 80%, more preferably 50 to 80%, a polyamide resin composition having a superior extension resistance and flexing fatigue can be obtained. Here, the "volume fraction (%)" means the volume fraction of the modifying polymer (C) included in the polyamide resin composition. Further, when the ratio of the volume fraction and the melt viscosity of the modifying polymer (C) and the polyamide resin (A) satisfies the following formula (I) ($\alpha > 1$), it is possible to disperse, the modifying polymer (C) more evenly in the polyamide resin (A).

$$\alpha = (\phi d/\phi m) \times (\eta m/\eta d) < 1 \qquad (I)$$

where, $\phi d$ indicates a volume fraction of the modifying polymer (C);

$\phi m$ indicates a volume fraction of the polyamide resin (A);

$\eta d$ indicates a melt viscosity of the modifying polymer (C);
(Note: measurement conditions: Toyo Seiki Capillary Rheometer used for measurement of capillary viscosity at a measurement temperature of 240° C. and a shear rate of 1200 sec$^{-1}$) and $\eta m$ indicates a melt viscosity of the polyamide resin (A)
(Note: measurement conditions: Toyo Seiki Capillary Rheometer used for measurement of capillary viscosity at a measurement temperature of 240° C. and a shear rate of 1200 sec$^{-1}$).

As the polyamide resin (A) usable in the present invention, Nylon 6, Nylon 66, Nylon 6.66, Nylon 612, Nylon 11, Nylon 12, Nylon 46, Nylon 6.66.610, Nylon MXD6, etc. may be mentioned. These may be used alone or in any combinations thereof.

As the functional group (B) reactive with the polyamide resin (A) usable in the present invention, for example, an acid anhydride group, an epoxy group, a halogen group, a carboxyl group, an amino group, a hydroxyl group, and other functional groups may be mentioned. Use of an acid anhydride group, for example, a maleic acid anhydride group, is preferred.

As the modifying polymers (C) having the anhydride group usable in the present invention, a homopolymer or a copolymer of olefins may be mentioned. Use of copolymers of ethylene and at least one α-olefin selected from propylene, butene, hexene and octene is particularly preferred from the viewpoints of the elongation at break and the strength at break.

In the polyamide resin composition, as explained above, it is important that the modifying polymer (C) has values of the tensile stress at break and the tensile elongation at break (measured both according to JIS K6251 at −20° C.) of 30 to 70% and 100 to 500% of the values of the polyamide resin (A), respectively. If the value of the tensile stress at break is lower than the above value, the material failure of the modifying polymer (C) unpreferable occurs and a load unpreferably acts from the polyamide resin (A) matrix. Further, if the value of the tensile elongation at break is smaller than the above value, similarly with the tensile stress at break, material failure of the modifying polymer (C) unpreferably occurs.

The polyamide resin composition according to the present invention may include, in addition to the above ingredients, carbon black, silica, or another filler, a vulcanization or cross-linking agent, a vulcanization or cross-linking accelerator, various types of oils, an antioxidant, a plasticizer, oil, a coloring agent, and various types of other additives generally blended into rubber compositions and resin compositions. These additives may be mixed by general methods to compound them into the composition. The compounding amount may also be made the conventional general amount when mixing, so long as the object of the present invention is not adversely affected.

EXAMPLES

Examples will now be used to further explain the present invention, but the scope of the present invention is by no means limited to these Examples.

Examples 1 to 9 and Comparative Examples 1 to 9

Preparation of Samples

The ingredients shown in Tables I to IV were mixed as follows to obtain polyamide resin compositions.

Pellets of the modifying polymers and pellets of the polyamide resin shown in Table V to Table VII were charged into twin-screw extruders (TEX44, made by Japan Steel Works) and melt mixed. The mixing conditions were 220° C. for 3 minutes and a shear rate of 1200 sec$^{-1}$. The materials were continuously discharged from the extruder in the form of strands, cooled by water, then cut by cutters to obtain pellet-shaped polyamide resin compositions. To obtain sheets for the fatigue tests, the prepared pellets of the polyamide resin compositions were charged into single-screw extruders provided with sheeting dies and formed to sheet shapes.

The polyamide resin compositions thus obtained were then subjected to fatigue tests by the test method shown below. The results are shown in Tables I to IV.

Test Method for Physical Property Evaluation

Fatigue test: A polyamide resin composition shaped into a sheet by a sheeting die was punched out to a JIS dumbbell No. 3 shape (JIS K6251), then the dumbbell shaped sample was attached after a fatigue test and subjected to a constant strain and flexing test. This was performed under conditions of a chuck interval of 54 mm, a tensile strain rate of 20%, a compressive strain rate of 20%, a repetition frequency of 6.67 Hz, and a test temperature of −20° C. The test was terminated when the sample broke.

Judgment: Good . . . repetition frequency until breakage of more than 500,000 (cut off at 1,000,000×)

Poor . . . repetition frequency until breakage of less than 500,000×

TABLE I

| Type of polymer Formulation (wt. parts) | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| BESNOTL(Nylon 11)*[1] | 40 | 45 | 55 | — | 45 | — | 45 | — |
| BMNO(Nylon 11)*[1] | — | — | — | 45 | — | 45 | — | 45 |
| MA8510(Mah-EB)*[2] | 60 | — | — | — | — | — | — | — |
| MP0620(Mah-EP)*[2] | — | 55 | — | — | — | — | — | — |
| VA1840(Mah-EO)*[2] | — | — | 45 | — | — | — | — | — |
| AR201(Mah-EEA)*[2] | — | — | — | 55 | — | — | — | — |
| Dumilan C1550(saponified EVA)*[2] | — | — | — | — | 55 | — | — | — |
| Yokohama rubber IIR(Mah-IIR)*[3] | — | — | — | — | — | 55 | — | — |
| EPDM*[3] | — | — | — | — | — | — | 55 | — |
| X2(Br-IIR)*[3] | — | — | — | — | — | — | — | 55 |
| ENR25(E-NR)*[3] | — | — | — | — | — | — | — | — |
| φd/φm | 1.5 | 1.22 | 0.82 | 1.22 | 1.22 | 1.22 | 1.22 | 1.22 |
| ηm/ηd | 0.27 | 0.67 | 0.35 | 0.77 | 0.78 | 0.50 | 0.63 | 0.43 |
| α(formula (I)) | 0.41 | 0.82 | 0.29 | 0.94 | 0.95 | 0.61 | 0.77 | 0.53 |
| TBd/TBm*[4] | 0.52 | 0.41 | 0.53 | 0.39 | 0.31 | 0.04 | 0.07 | 0.06 |
| EBd/EBm*[5] | 1.3 | 1.3 | 1.2 | 1.5 | 1.47 | 1.5 | 1.47 | 1.59 |
| Fatigue test | 1,000,000 cut off | 1,000,000 cut off | 910,000 | 700,000 | 550,000 | 200,000 | 20,000 | 5,000 |
| Judgment | Good | Good | Good | Good | Good | Poor | Poor | Poor |

*[1]see Table V

*[2]see Table VI

*[3]see Table VII

*[4]TBd = Tension at Break of Modifier Polymer (determined according to JIS K6251)

TBm = Tension at Break of Polyamide Resin (determined according to JIS K6251)

*[5]EBd = Elongation at Break of Modifier Polymer (determined according to JIS K6251) EBm = Elongation at Break of Polyamide Resin (determined according to JIS K6251)

TABLE II

| Type of polymer Formulation (wt. parts) | Comp. Ex. 4 |
|---|---|
| BESNOTL(Nylon 11)*1 | — |
| BMNO(Nylon 11)*1 | 30 |
| MA8510(Mah-EB)*2 | — |
| MP0620(Mah-EP)*2 | — |
| VA1840(Mah-EO)*2 | — |
| AR201(Mah-EEA)*2 | — |
| DumilanC1550(saponified EVA)*2 | — |
| Yokohama Rubber IIR(Mah-IIR)*3 | — |
| EPDM*3 | — |
| X2(Br-IIR)*3 | — |
| ENR25(E-NR)*3 | 70 |
| φd/φm | 2.3 |
| ηm/ηd | 0.25 |
| α (formula (I)) | 0.58 |
| TBd/TBm*4 | 0.21 |
| EBd/EBm*4 | 1.47 |
| Fatigue test | 80,000 |
| Judgment | Poor |

*1 see Table V
*2 see Table VI
*3 see Table VII
*4 see Footnote of Table I

TABLE III

| Type of polymer Formulation (wt. parts) | Ex. 6 | Ex. 7 | Comp. Ex. 5 | Comp. Ex. 6 |
|---|---|---|---|---|
| 3030XA(Nylon 12)*1 | 40 | 50 | 45 | 45 |
| MA8510(Mah-EB)*2 | 60 | — | — | — |
| VA1840(Mah-EO)*2 | — | 50 | — | — |
| EPDM*3 | — | — | 55 | — |
| ENR25(E-NR)*3 | — | — | — | 56 |
| φd/φm | 1.5 | 1.0 | 1.22 | 1.22 |
| ηm/ηd | 0.30 | 0.39 | 0.69 | 0.703 |
| α(formula (I)) | 0.45 | 0.39 | 0.84 | 0.86 |
| TBd/TBm*4 | 0.52 | 0.41 | 0.07 | 0.17 |
| EBd/EBm*4 | 1.19 | 1.15 | 1.38 | 1.25 |
| Fatigue test | 1,000,000 cut off | 1,000,000 cut off | 3,000 | 50,000 |
| Judgment | Good | Good | Poor | Poor |

*1 see Table V
*2 see Table VI
*3 see Table VII
*4 see Footnote of Table I

TABLE IV

| Type of polymer Formulation (wt. parts) | Ex. 8 | Ex. 9 | Ex. 10 | Ex. 11 | Comp. Ex. 7 | Comp. Ex. 8 |
|---|---|---|---|---|---|---|
| CM6001FS(Nylon 6.66)*1 | 45 | 45 | — | — | 55 | — |
| CM1017(Nylon 6)*1 | — | — | 40 | 45 | — | 40 |
| MA8510(Mah-EB)*2 | 55 | — | 60 | — | — | — |
| VA1840(Mah-EO)*2 | — | 55 | — | 55 | — | — |
| Yokohama Rubber IIR(Mah-IIR)*3 | — | — | — | — | 45 | 60 |
| φd/φm | 1.22 | 1.22 | 1.5 | 1.22 | 0.82 | 1.5 |
| ηm/ηd | 0.42 | 0.55 | 0.18 | 0.29 | 1.17 | 0.62 |
| α(formula (I)) | 0.51 | 0.67 | 0.27 | 0.35 | 0.96 | 0.93 |
| TBd/TBm*4 | 0.43 | 0.44 | 0.43 | 0.44 | 0.03 | 0.03 |
| EBd/EBm*4 | 1.38 | 1.33 | 1.4 | 1.36 | 1.47 | 1.5 |
| Fatigue test | 1,000,000 cut off | 1,000,000 cut off | 700,000 | 550,000 | 2,000 | 1,000 |
| Judgment | Good | Good | Good | Good | Poor | Poor |

*1 see Table V
*2 see Table VI
*3 see Table VII
*4 see Footnote of Table I

TABLE V

Tensile Properties and Capillary Viscosity of Polyamide Resin at −20° C.

| | Arkema Rilsan B BESNOTL | Toray Amylan CM6001FS | Ube Industries UBESTA 3030XA | Arkema Rilsan B BMNO | Toray Amylan CM1021FS |
|---|---|---|---|---|---|
| Type of Polymer | Nylon 11 | Nylon 6.66 | Nylon 12 | Nylon 11 | Nylon 6 |
| EB(%)*1 | 490 | 450 | 520 | 440 | 460 |
| TB(MPa)*2 | 90 | 110 | 100 | 80 | 110 |
| Capillary viscosity (Pa·s)*3 | 94 | 146 | 104 | 62 | 77 |

*1: Determined according to JIS K-6251 method
*2: Determined according to JIS K-6251 method
*3: Determined according to JIS K-7199 method

TABLE VI

Tensile Properties and Capillary Viscosity of Modifier Polymer at −20° C.

| | Mitsui Chemicals TAFMER MA8510 | Mitsui Chemicals TAFMER MP0620 | Exxon Mobile Chemicals Exxcelor VA1840 | Mitsui Dupont Polychemical HPR AR201 | Takeda Chemical Industries Dumilan C1550 |
|---|---|---|---|---|---|
| Type of polymer | Maleic acid anhydride modified ethylene-butene copolymer | Maleic acid anhydride modified ethylene-propylene copolymer | Maleic acid anhydride modified ethylene-octene copolymer | Maleic acid anhydride modified ethylene-ethyl acrylate copolymer | Ethylene-vinyl acetate-vinyl alcohol copolymer |
| EB (%)*1 | 620 | 660 | 600 | 720 | 630 |
| TB(MPa)*1 | 47 | 37 | 48 | 35 | 28 |
| Capillary viscosity (Pa·s)*1 | 350 | 140 | 266 | 81 | 120 |

*1:see Footnote of Table V

TABLE VII

Tensile Properties and Capillary Viscosity of Rubber Ingredient at −20° C.

| | Yokohama Rubber Mah-IIR*1 | Sumitomo Chemical EPDM | LANXESS Rubber BROMOBUTYL X2 | Malaysia ENR25 |
|---|---|---|---|---|
| Type of polymer | Maleic acid anhydride modified butyl rubber | Ethylene-propylene copolymer | Halogenated butyl rubber | Epoxylated natural rubber |
| EB(%)*2 | 660 | 720 | 700 | 650 |
| TB(%)*2 | 3.5 | 6.6 | 5 | 17 |
| Capillary viscosity (Pa·s)*2 | 125 | 150 | 143 | 250 |

*1:Preparation Method: Given amounts of the brominated butyl rubber, antioxidant, maleic anhydride and magnesium oxide were charged into a pressurized kneeder heated at 70° C., followed by mixing the predetermined time (7 minutes) to obtain the desired product. The amount of maleic anhydride introduced into the butyl rubber is 1.5 mol %, as determined by $^1$H-NMR analysis.
*2:See Footnote of Table V

INDUSTRIAL APPLICABILITY

The polyamide resin composition according to the present invention can be used as the inner liners of pneumatic tires etc. and further can be used as, for example, outside tube materials, inside tube inner layer materials, and inside tube outer layer materials for hoses.

The invention claimed is:

1. A polyamide resin composition comprising a polyamide resin (A), as a matrix, and an ethylene copolymer (C), dispersed therein, having, a functional group (B) reactive with the polyamide resin (A), wherein the tensile stress at break of the ethylene copolymer (C) is 30 to 70% of the tensile stress at break of the polyamide resin (A), and the tensile elongation at break of the modifying polymer (C) is 100 to 500% of the tensile elongation at break of the polyamide resin (A), wherein the ethylene copolymer (C) has a volume fraction of 40 to 80% based on a 100% volume of resin (A) and ethylene copolymer (C) and the functional group is selected from the group consisting of acid anhydride, epoxy, halogen, carboxyl, amino and hydroxyl.

2. The polyamide resin composition as claimed in claim 1, wherein the ethylene copolymer (C) has a volume fraction of 50 to 80%.

3. The polyamide resin composition as claimed in claim 1, wherein the ratio of the volume fraction and the melt viscosity of the ethylene copolymer (C) and the polyamide resin (A) satisfies the following formula (I):

$$\alpha = (\phi d/\phi m) \times (\eta m/\eta d) < 1 \quad (I)$$

wherein,
 φd: the volume fraction of ethylene copolymer (C)
 φm: the volume fraction of polyamide resin (A)
 ηd: the melt viscosity of ethylene copolymer (C)
 ηm: the melt viscosity of polyamide resin (A)

4. The polyamide resin composition as claimed in claim 1, wherein the polyamide resin (A) is at least one resin selected from the group consisting of Nylon 6, Nylon 66, Nylon 6/66, Nylon 6/12, Nylon 11, and Nylon 12.

5. The polyamide resin composition as claimed in claim 1, wherein the functional group (B) is a carboxylic acid anhydride group.

6. The polyamide resin composition as claimed in claim 1, wherein the ethylene copolymer (C) is a copolymer of ethylene and at least one α-olefin selected from propylene, butene, hexene and octene.

7. A pneumatic tire using, as an inner liner, a polyamide resin composition according to claim 1.

8. A hose using, as at least one layer, a polyamide resin composition according to claim 1.

* * * * *